March 24, 1959 M. P. SIEGER 2,878,582
APPARATUS FOR HANDLING COILED ROD BUNDLES
Filed Oct. 13, 1954 3 Sheets-Sheet 1

INVENTOR.
MAURICE P. SIEGER
BY
HIS ATTORNEY

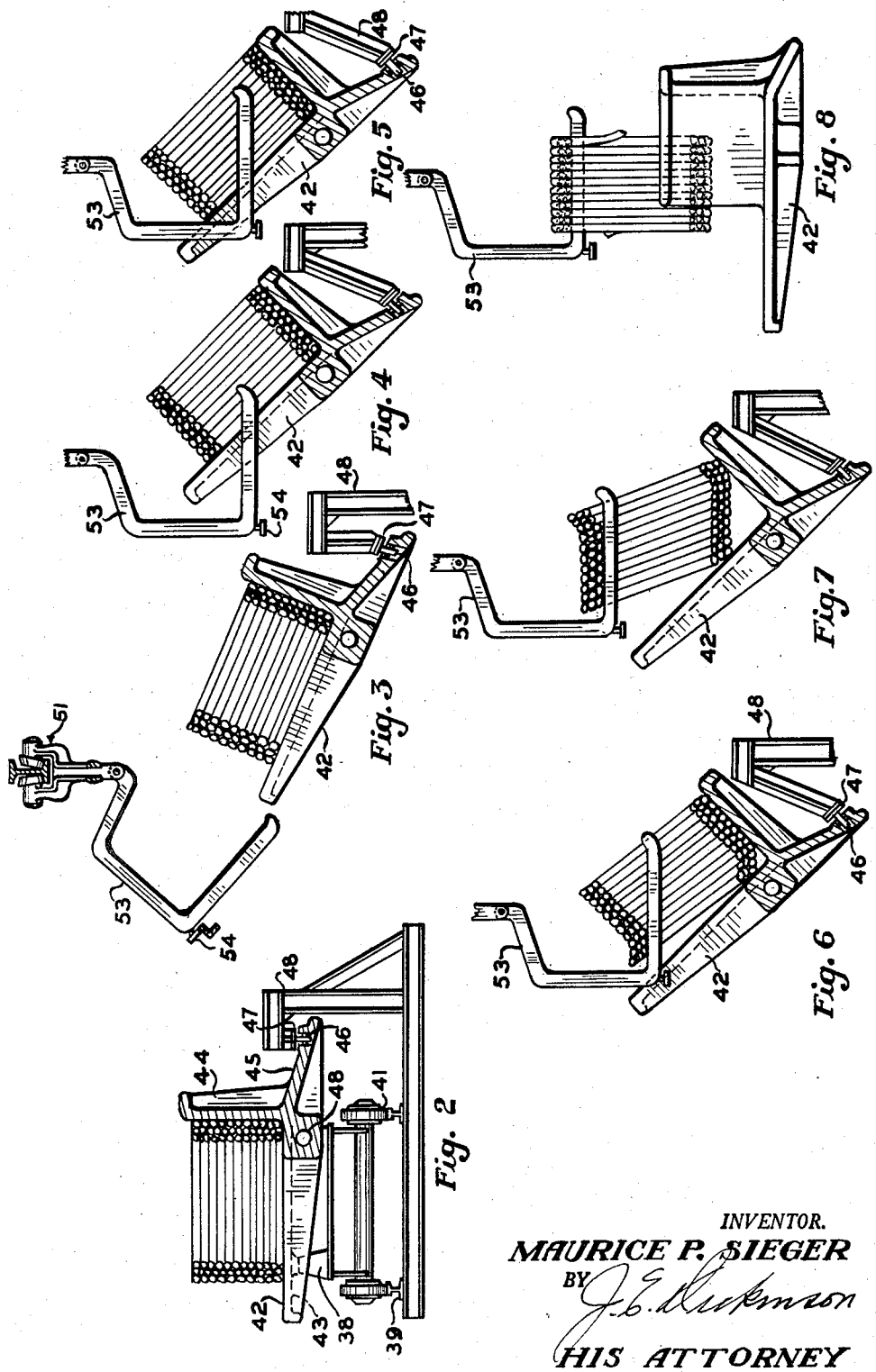

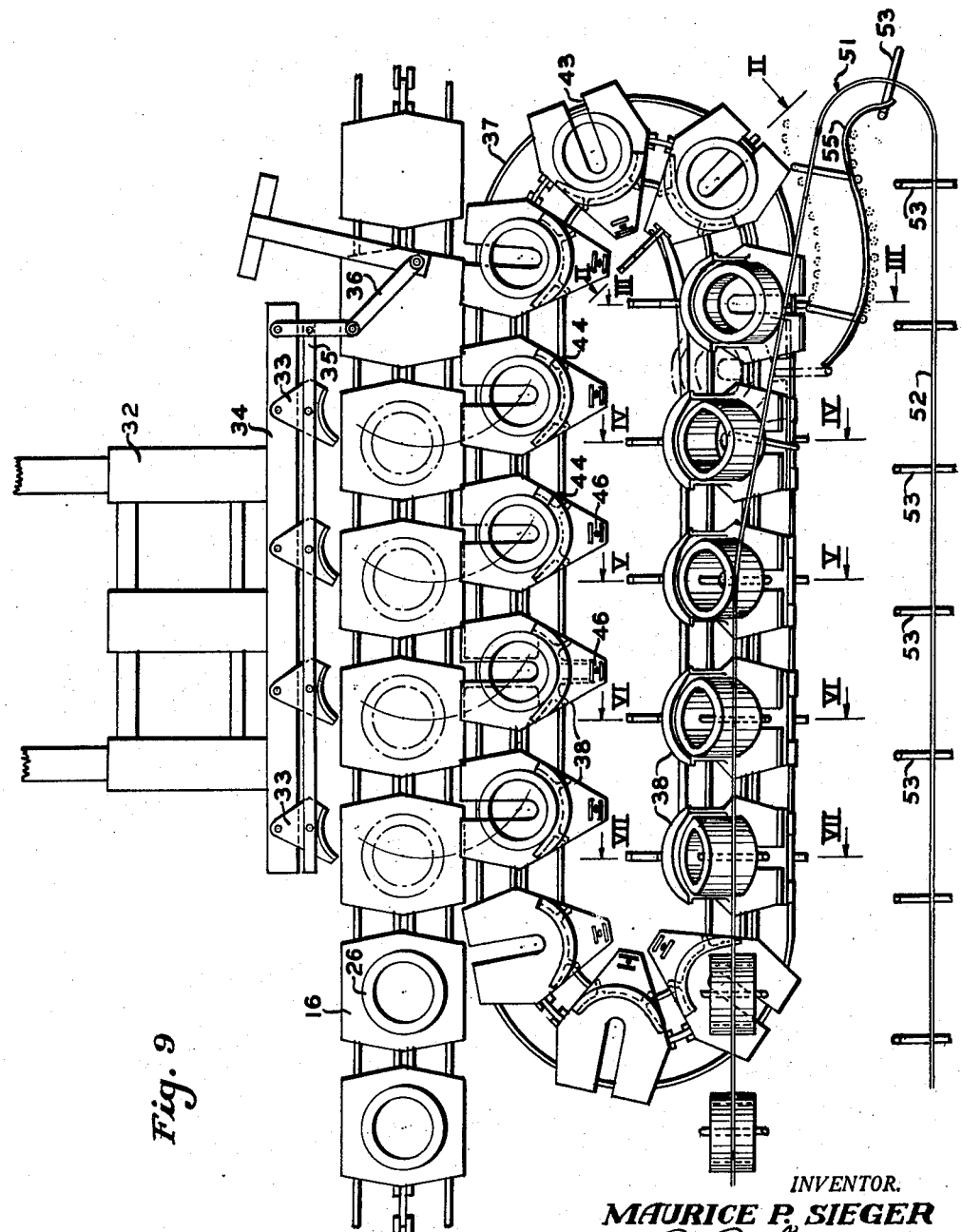

United States Patent Office 2,878,582
Patented Mar. 24, 1959

2,878,582

APPARATUS FOR HANDLING COILED ROD BUNDLES

Maurice P. Sieger, Bridgeville, Pa., assignor to United Engineering and Foundry Company, Pittsburgh, Pa., a corporation of Pennsylvania Application October 13, 1954, Serial No. 462,035

13 Claims. (Cl. 34—105)

This invention relates to an improvement in apparatus for the handling of coiled rod bundles or the like and more particularly to apparatus for effectively removing and transferring such bundles from a coiling station in a continuous and efficient manner.

It has been the practice heretofore in the conveying and transferring of coiled bundles of rods produced in a rod or bar mill to deposit the bundles, subsequent to their being coiled, on a continuously moving chain type conveyor from which the bundles are transferred to an adjacent hook conveyor for conveyance to storage or further processing stations. Inasmuch as the modern mills are designed to produce coils of a substantially greater weight than heretofore produced, for example on the order of 1200 pounds as compared to a maximum of 600 pounds for the prior mills, it becomes necessary to provide adequate transferring and conveying apparatus which will effectively handle coils of such increased weight. Moreover, the transferring and conveying practice employed heretofore usually provides for transferring the bundles to the hook conveyor while still at a very high temperature so that when engaged and supported by the hooks the bundles will sag due to their weight and become oval or "horsecollar" in shape. The coils when permitted to cool in this state create objectionable handling and feeding problems during further processing operations.

Still another objection to the prior practice employed for conveying and transferring rod bundles is the lack of adequate controlled cooling facilities not only for cooling the rods sufficiently to prevent their being deformed during handling but also for controlling the cooling of the bundles, whether rapidly or slowly as may be desired for the particular type of steel being rolled in the mill. For example, when high alloy steel rods are rolled and coiled it is advantageous to cool the bundles very slowly thereby to improve the metallurgical characteristics thereof, whereas when high carbon steel rods are rolled and coiled it is desirable to reduce the temperature of the rods rapidly so as to avoid decarburizing of the steel and formation of excessive scale.

It is therefore an object of this invention to provide apparatus for handling of coiled rod bundles which will be effective in continuously transferring and conveying such bundles from their coiling stations to a storage or to a further processing station associated therewith.

It is another object of the present invention to provide coil handling apparatus in the form of three operatively arranged conveyors by which a plurality of rod bundles are transferred and conveyed from the coiling station to a storage or further processing station.

It is a further object of this invention to provide apparatus for controlling the cooling of the hot coiled bundles employing zones through which the bundles are passed either to be rapidly or slow cooled for metallurgical and physical reasons.

Still a further object of the present invention is to provide coil transferring and conveying apparatus including effective transfer means associated therewith by which the continuous operation of the coilers at the various coiling stations will be assured.

A further object of this invention is to provide a coil conveyor system which will assure the required cooling of the hot coil to avoid its being deformed when transferred.

These objects, as well as the various other novel features and advantages of the present invention, will become apparent from the following description and accompanying drawings of which:

Figures 2, 3, 4, 5, 6, 7 and 8 are sectional views taken on the respective lines II—II through VIII—VIII of Figure 1 and show the relative position of a coil and hook during the transfer from the intermediate conveyor to the hook conveyor, and Figure 9 is an enlarged partial plan view of the discharged section of the conveying system.

Figure 1:
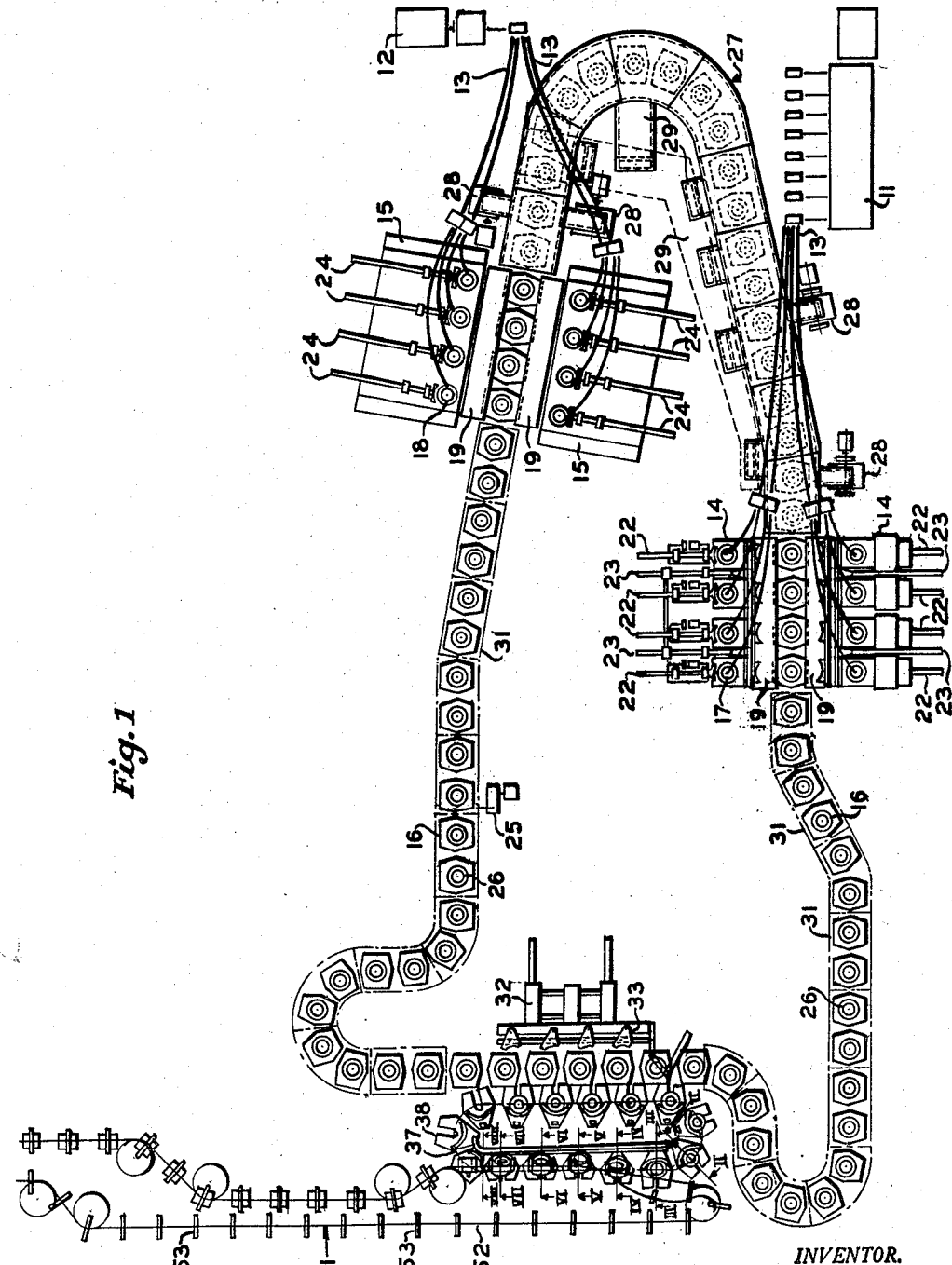
Figure 1 is a plan view of the rod bundle conveying system as disclosed herein.

With reference to Figure 1, there is illustrated one embodiment of the herein disclosed invention and as shown in this particular arrangement, the conveyor system is operatively associated with the delivery end of a rod mill in which reference character 11 represents the finishing train of a four strand rod mill and 12 represents an auxiliary stand of the mill employed for producing rods of a larger size than those rolled in train 11. As the rods issue from the last mill stand, they are conveyed by pouring pipes 13 to individual reeling stations 14 and 15 respectively by which apparatus the rods are coiled in bundle form. The reels 17 in station 14 are of the higher speed overhead "pouring" type while the reels 18 in station 15 are of a lower speed "laying" type as necessitated by the speeds of their respective stands 11 and 12. As shown, each station is made up of eight reels in which four reels are arranged directly opposite to each other on both sides of an endless conveyor 16. Separating the reels 17 and 18 and the conveyor 16 there are tables 19 which serve to collect a plurality of coils as transferred from the reels. By reason of the high speed overhead "pouring" type reels 17 being employed in the coiling station 14 there is provided for each reel an individual pusher 22 which serves to transfer the coils as they are completed in the reel 14 to the table 19 upon which four coils will be deposited in side-by-side relationship. In addition to the pusher 22 there is provided an auxiliary pusher 23 which, in its inoperative position, rests above the table, and, when in its operational position, encompasses the reels 17 on being lowered directly behind and in pushing relation with the coils supported by the table 19 and without interfering with the operation of the reels. In this manner it is possible to deposit four coils at a time on the conveyor 16.

The pushing arrangement employed for the reels 18 is somewhat simplified in form and each reel is provided with a pusher 24 individually operable to transfer a coil from its respective reel to the table 19 and then to operate as a unit to transfer simultaneously four coils from the table 19 onto the stationary cars of the conveyor 16. Inasmuch as the reeling mechanism is underneath the table 19 there will be no interference with the reeling of the next coil when the pusher is operated to transfer the previous coil from the table 19 to the conveyor 16.

The conveyor 16 as shown is of substantial length, the length of which is predicated on the cooling time desired between the coiling stations and the discharge station and which in this particular arrangement illustrated may vary from 10 to 20 minutes depending upon the size of the coils being coiled.

The coiling stations 14 and 15 are so designed and positioned along the conveyor to assure the same amount of cooling time for the coils regardless of which station may be employed for coiling. To provide for this feature the conveyor may be reversely driven by drive unit 25 so that for the coiling station 15 the conveyor is advanced in a clockwise direction whereas for coils coming out of station 14 the conveyor 16 is driven in a counter-clockwise direction. The conveyor itself comprises a plurality of interconnected cars 26 which serve to make up an endless conveyor. The cars 26 are advanced by means of a continuous center chain, not shown, connected to the drive 25 which operated intermittently and in such a fashion to index the cars in groups of four directly in front of the two coiling stations 14 and 15. By this arrangement four cars will always be available at the coiling stations so that as soon as four coils have been placed thereon, the conveyor will be advanced at a speed to bring up four empty cars to a position of rest at the coiling station for receiving the next coils.

Between the coiling stations 14 and 15 there is provided means in the form of a controlled air cooling tunnel 27 for controlling the cooling of the bundles deposited on the conveyor. Although not shown in detail, the construction of the cooling tunnel is preferably rectangular in cross section enclosing the coil conveyor 16, and having at the side thereof plenum sections for receiving air from a plurality of blower units 28. Each of the blower units is equipped with an atomizer so that, if desired, water may be atomized and introduced with the air. There is also provided suitable hot air exhaust passageways 29 and suction fans which, though not specifically shown, may be of the type normally employed for exhaust purposes.

In addition to this rapid or forced cooling system 27, there is provided a slow cooling system which consists of a plurality of insulated portable covers 31 shown in dot and dash lines, which are placed along a portion of the path of the conveyor 16 and through which the conveyor cars pass for supplementing the controlled air cooling system to give an additional cooling time for each coiling station 14 and 15.

In the production of high carbon steel decarburizing of the steel and excessive scale formation is avoided inasmuch as the bundles are conveyed through the controlled air cooling tunnel in which atomized air has been introduced so as to reduce rapidly the temperature of the bundles to the required temperature. However, in the rolling of high alloy steel in which slow cooling is desired, no air or a controlled amount thereof is introduced into the cooling tunnel and, in addition thereto, the portable covers are placed along the path of the conveyor so that the coils passing therethrough will be prevented from cooling too rapidly thus to improve the metallurgical characteristics of the rod.

At the discharge station of the conveyor 16 the conveyor cars travel in a straightforward direction and are in line when the coils are brought adjacent to the discharge pusher 32. The pusher, as best shown in Figure 9, comprises four pivotally mounted heads 33 carried by a common support 34 interconnected by a rod 35, which, in turn, is connected to a fixed pivotal link 36 through which linkage a transverse forward movement is given to the heads 33 from the instant the coils are engaged thereby.

To receive the coils as transferred from the conveyor 16, there is arranged parallel to the straightforward portion thereof a second conveyor 37 of a continuous endless type which is driven continuously by a suitable drive not shown in a clockwise direction. This conveyor is made up of a plurality of cars 38 which, as shown in Figure 2, are mounted on tracks 39 by rollers 41 and which are provided with tiltable platforms 42 adapted to pivot about pins 48 to an upward position. Each car 38 is provided with a center slot 43 and a back portion 44 against which the coils are abutted when received by the car and positioned over the slot 43. Extending outward from the back of each car there is a projection 45 upon the upper side of which there is provided a cam roller 46. The roller is adapted to engage with a cam track 47 carried by a frame 48, and extending along the path of the conveyor cars. As best shown in Figures 2 through 7 as the cars advance from the coil receiving station to a coil delivery station on the opposite side of the conveyor, the cam rollers 46 make contact with the track 47 so as to tilt progressively the platform 42 from its horizontal to its ultimate inclined position as viewed in Figures 4 through 7.

Arranged adjacent to the second conveyor 37 there is a third conveyor 51 which travels in a path parallel to the conveyor 37 for a portion of its length when adjacent to the delivery station of the conveyor. The third conveyor 51 is of the overhead suspended hook type and consists in general of an endless continuous driven chain 52 on which there is pivotally mounted a plurality of hooks 53. The speed of the conveyor 51 and that of the second conveyor 37 is synchronized on the cars 38 and the hooks 53 are so arranged that they line up with each other along the portion of the path comprising the hook pick-up station. The hooks pivot perpendicularly to their path of travel and are provided with individual cam rollers 54 mounted at the lower outer corner thereof. The cam rollers are adapted to engage with a curved cam track 55 mounted on a suitable support provided therefor and arranged in the path of travel of the hooks at a point prior to the point of transfer of the coils. As best shown in Figure 9, as the hooks advance around the bend and change direction of their path of travel the cam rollers 54 come in contact with the cam track 55 to progressively tilt the hooks rearwardly away from the conveyor cars 38 thus to avoid any interfering with the cars 38 during the interval that the cars and hooks are advancing toward each other as they move around the bend of their respective conveyors. After the hooks have advanced beyond the bend in their path, they are gradually brought back to their original positions as permitted by the contour of the cam track 55. It will be noted in Figure 9 that the hook conveyor 51 is arranged to gradually take a position along the conveyor 37 so that the hooks gradually enter into the slots 43 with the ends thereof passed into the center portion of the coils as the platforms 42 are tilted, particularly as shown in Figures 3, 4 and 5. From the position shown in Figure 5, the coil hooks rise as they move along their path so as to engage with and lift a coil from the tilted conveyor car platforms 42, as shown in Figures 6, 7 and 8, the platforms 42 being lowered to their horizontal position as the cam rollers 46 reach the end of the cam track 47.

The operation of the present invention may be briefly summarized as follows: Let it be assumed that the rods are issuing from the finishing train 11 and by means of pouring pipe 13 conveyed to the coiling station 14 and into the respective reels 17 thereof. Although not shown in the embodiment herein defined, a flying shear may be provided between the last finishing stand and the coiling station which would serve to shear the rod thereby to produce a coil of any less predetermined weight than that obtained by coiling the entire rod at one point. After the respective reels 17 on each side of the conveyor 16 are filled, the coils are immediately removed therefrom by the individual pushers 22 and deposited on the adjacent table 19. As soon as four coils have been placed upon the table, the auxiliary pusher 23 is operated to transfer the coils simultaneously as a group to the stationary conveyor cars 31 adjacent thereto. The cars carrying the coils are then advanced a sufficient distance to position the next four empty cars adjacent to the reels 17. By this time, the coils in the reels on the opposite side of the conveyor will have been transferred to table 19 adjacent thereto and are in readiness for transferring to the cars by operation of their associated pushers 23. The operations are closely timed and interference at the coiling and transfer stations is avoided inasmuch as there will always be provided four empty cars at the transfer station to receive the coils delivered by the coilers.

From the coiling station 14, the coils are intermittently advanced in a counter-clockwise direction into and through the controlled cooling tunnel 27. As heretofore explained, depending upon the type of steel being produced and the cooling effect desired, cooling of the coils may be accomplished rapidly or slowly. If slow cooling is desired, then the speed of the blowers may be reduced or the blowers stopped entirely and, if necessary, the portable conveyor covers 31 placed along the remaining path of the conveyor 16. Whether cooling of the coil bundles is accomplished rapidly or slowly, the length of the conveyor itself will permit sufficient cooling of the coils to take place in order to avoid any objectionable deformation of the coils at the time it is received by the hooks.

Except for the change of direction of the conveyor from counter to clockwise, coils received from the station 15 are ultimately carried to the transfer station adjacent to the conveyor 37.

As the partially cooled coils are advanced to the discharge station and momentarily stopped in groups of four in front of the discharge pusher 32, the pusher is actuated to transfer the four coils therefrom on to the continuously moving second conveyor system 37 in a transverse forward direction and at a speed substantially corresponding to that of the conveyor cars. The cars 38 of the second conveyor on which the coils are received in groups of four are advanced to the opposite side thereof where the cam rollers 46 will come in contact with the cam track 47 to progressively tilt the cars and coils thereon to a backward inclined position. At the same time the hooks 53 of the conveyor 51 in approaching the point of transfer are tilted outward by means of cam rollers 54 thereof coming into engagement with the cam track 55 so that the hooks avoid interfering with the adjacent cars 38 while the cars and the hooks are rounding the bends as they approach each other. The hooks of conveyor 51, being arranged to overhang the second conveyor 37, are brought into a position directly in line with the coils carried by the cars 38 and by reason of the inclined position thereof, the hook ends will pass through the slots 43 of the cars 38 and into the center of the coils to engage the inner surfaces thereof and as the hooks are raised the coils are lifted from the cars and carried away to a place of storage or to a place in the mill for further processing.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. Apparatus for handling coils and the like comprising an endless conveyor on which said coils are first placed with their central axes extending in substantially a vertical direction, means for driving said conveyor, a second endless driven conveyor arranged adjacent to said first conveyor adapted to move parallel to and for a portion of the path of travel of said first conveyor, said second conveyor including a plurality of vertical tiltable elements upon which said coils are transferred from said first conveyor, said tiltable elements adapted to support said coils so as to expose a portion of the center thereof, means for transferring said coils from said first conveyor to said second conveyor while maintaining the axes thereof in substantially a vertical direction, a third endless driven conveyor arranged adjacent said second conveyor and adapted to travel parallel thereto for a portion of its path and in the same direction, said third conveyor having a plurality of pivotal coil engaging elements driven at a uniform speed corresponding to the speed of said second conveyor, means for tilting said elements to displace the axes of the coils carried thereby away from their vertical positions and means for displacing said coil engaging elements whereby the ends of said elements will pass into the central portions of the coils after the axes thereof have been displaced away from the vertical and engage the inner convolutions thereof to remove in sequence said coils from said tiltable elements during the interval said second and third conveyors are disposed to travel in parallel paths.

2. Apparatus for handling coils and the like comprising an endless conveyor on which said coils are first placed with their central axes extending in substantially a vertical direction, means for driving said conveyor, means defining a zone through which said conveyor passes for controlling the cooling of the coils carried thereby, means for supplying a coil temperature controlling medium to said zone, a second endless driven conveyor arranged adjacent to said first conveyor adapted to move parallel thereto for a portion of the path of travel of said first conveyor, said second conveyor consisting of a plurality of vertical tiltable elements for receiving coils from said first conveyor, said tiltable elements adapted to support said coils so as to expose a portion of the center thereof, means for transferring said coils from said first conveyor to said second conveyor while maintaining the axes thereof in substantially a vertical direction a third endless conveyor arranged adjacent said second conveyor and adapted to travel parallel thereto for a portion of its path and in the same direction, said third conveyor having a plurality of pivotal coil engaging elements and driven at a uniform speed corresponding to that of said second conveyor, means for displacing said coil tiltable elements during the interval said second and third conveyors are disposed to travel in parallel paths to displace the axes of the coils carried thereby away from their vertically extending positions and means for inserting the ends of said coil engaging elements within the openings of said coils thereby to engage the inner surfaces of said coils and remove them in sequence from said tiltable elements.

3. Apparatus for handling coils and the like comprising an endless conveyor, said conveyor consisting of a plurality of individual cars each so disposed as to receive and support a coil thereon with its axis extending in a vertical direction, coil loading and discharging stations arranged adjacent to said path of travel of said conveyor, intermittently operable driving means connected to and for driving said conveyor so as to position simultaneously a group of cars adjacent to said loading and discharging stations respectively, a plurality of coil forming reels included in each of said loading stations arranged directly opposite each other, adjacent to and on opposite sides of said conveyor, pushers operative with said reels adapted to remove and transfer coils therefrom and to said adjacent conveyor cars, pushers arranged at said coil discharge station, means operatively connected to and for moving said pushers to engage at their sides and to transfer said coils from said conveyor cars, a second endless conveyor arranged adjacent to said first conveyor onto which said coils with their axes vertically disposed are transferred from said first conveyor, said second conveyor consisting of a plurality of individual cars each having a slotted and vertically tiltable platform thereon upon which said coils are transferred by said discharge pushers, said tiltable platform adapted to support said coils so as to expose from beneath a portion of the center thereof, a third endless conveyor arranged adjacent to said second conveyor, a plurality of mounted hooks pivotally secured to said third conveyor, means for progressively tilting said platforms and the coils thereon to a substantial inclined upward position, means for tilting the open ends of said hooks rearwardly away from said second conveyor and then to reposition said hooks in their original position whereby the ends of said hooks will pass into said coil openings to remove in sequence said coils from said platforms.

4. Apparatus for handling coils and the like according to claim 3 in which the means for progressively tilting the platforms comprises a cam track arranged in the path of the second conveyor adjacent to the coil transfer point with which a cam on each of said platforms engages to progressively tilt said platforms and the coils thereon to a substantial inclined upward position.

5. Apparatus for handling coils and the like according to claim 3 in which the means for tilting the ends of said hooks rearwardly comprises a cam track arranged in the path of said third conveyor adjacent to said transfer point with which a cam on each of said hooks is adapted to engage first to tilt the ends of said hooks rearwardly away from said second conveyor to avoid interference therewith and then to reposition said hooks in their original positions.

6. Apparatus for handling coils and the like according to claim 3 in which the means for tilting the platform and the means for tilting the ends of said hooks rearwardly comprise a cam track arranged in the path of said second conveyor adjacent to said transfer point with which a cam on each of said platforms engage to tilt progressively said platforms and the coils thereon to a substantial inclined upward position, and a second cam track arranged in the path of said third conveyor adjacent to said transfer point with which a cam on each of said hooks is adapted to engage first to tilt the ends of said hooks rearwardly away from said second conveyor to avoid interference therewith and then to reposition said hooks in their original positions thereby to engage with the inner surfaces of said coils.

7. Apparatus for handling coils and the like according to claim 3 in which said second conveyor is adapted to advance in a forward direction at a speed substantially equal to the forward speed imposed upon said coil by said pusher and the tiltable platforms thereof provided with an abutment, with which a coil makes contact on being transferred to said platform, and a centrally located slot across which the coil in an upright position is supported by said platform.

8. Apparatus for handling coils and the like according to claim 3 in which means are provided adjacent to said first conveyor for regulating the rate of cooling of coils carried by said conveyor.

9. Apparatus for handling coils and the like according to claim 3 in which means are provided comprising a tunnel through which coils pass when being conveyed by said first conveyor to the point of delivery and means for supplying to and circulating a cooling medium through said tunnel and into contact with coils passing therethrough.

10. Apparatus for handling coils and the like according to claim 3 in which means defining two zones are provided adjacent to said first conveyor for regulating the rate of cooling of coils carried by said conveyor and means for supplying to and circulating a cooling medium through said first zone and into contact with coils passing therethrough.

11. Apparatus for handling coils and the like according to claim 3 in which means defining two zones are provided adjacent to said first conveyor for regulating the rate of cooling of coils carried by said conveyor, means for supplying to and circulating a cooling medium through said first zone and means for varying the length of said second zone.

12. Apparatus for handling coils and the like comprising an endless conveyor of substantial length, said conveyor consisting of a plurality of individual cars each adapted to support a coil with its axis extending in a vertical direction, coil loading and discharging stations arranged adjacent to said path of travel of said conveyor, means for intermittently driving said conveyor forwardly or rearwardly so as to position simultaneously a group of empty cars adjacent to said loading station and a group of coil carrying cars adjacent to said discharging stations respectively, said loading station including two coiling stations for coiling into bundles hot rolled rods as they issue from a rolling mill, a plurality of reels included in each of said coiling stations arranged directly opposite each other and on opposite sides of said conveyor, pushers operative with said reels adapted to remove a coil therefrom, tables arranged between said reels and said conveyor for receiving and collecting said coils transferred from said reels in numbers equal to the number of empty cars to be positioned there in front, means for transferring said group of coils from said table to said conveyor cars simultaneously, pushers arranged at said conveyor car coil discharge station adapted to transfer simultaneously a plurality of coils from said conveyor cars in a transverse forward direction, a second relatively short continuous conveyor arranged adjacent to said first conveyor adapted to move parallel thereto for a portion of the path of travel of said first conveyor, said second conveyor advanced in a forward direction continuously and at a speed substantially equal to the forward speed imposed upon said coil by said pusher and consisting of a plurality of individual cars having a vertical tiltable platform thereon upon which said coils are transferred by said discharge pushers, said tiltable platforms having central slots therein over which a coil supported thereon rests while in its upright position and a vertical centering back portion against which said coil is supported when said platform is tilted upwardly, a third continuous conveyor arranged adjacent to said second conveyor and adapted to travel parallel thereto for a portion of its path and in the same direction during which said coils are transferred from said second conveyor to said third conveyor, said third conveyor having a plurality of pivotally mounted hooks and driven at a uniform speed corresponding to that of said second conveyor, a cam track arranged in the path of said second conveyor adjacent to said transfer point with which a cam on each of said platforms engages to progressively tilt said platforms and the coils thereon to a substantially inclined upward position, a second cam track arranged in the path of said third conveyor adjacent to said transfer point with which a cam on each of said hooks is adapted to engage first to tilt the ends of said hooks rearwardly away from said second conveyor to avoid interference therewith and then to reposition said hooks in their original positions whereby the ends of said hooks will pass through the slots of said platforms and into said coil openings to remove said coils from said platforms.

13. Apparatus for handling coils and the like according to claim 12 in which there is provided a zone through which cars of said first conveyor pass for controllably cooling the coils carried thereby, means for supplying a coolant to said zone, means for controlling the amount of coolant supplied to said zone, and a second zone through which said cars pass for reducing the rate of cooling of the coils carried thereby.

References Cited in the file of this patent

UNITED STATES PATENTS

| Number | Name | Date |
|---|---|---|
| 801,523 | Hinchman et al. | Oct. 10, 1905 |
| 1,869,354 | Bletso et al. | Aug. 2, 1932 |
| 1,911,912 | Mathieson | May 30, 1933 |
| 2,073,221 | Reece et al. | Mar. 9, 1937 |
| 2,135,778 | Wyland | Nov. 8, 1938 |
| 2,199,061 | Young et al. | Apr. 30, 1940 |
| 2,207,648 | Wick | July 9, 1940 |
| 2,217,452 | Peck | Oct. 8, 1940 |
| 2,257,487 | Tenney | Sept. 30, 1941 |
| 2,595,006 | Sheperdson | Apr. 29, 1952 |
| 2,628,702 | Mabrey | Feb. 17, 1953 |